United States Patent [19]

Kawamura

[11] Patent Number: 4,958,497
[45] Date of Patent: Sep. 25, 1990

[54] DRIVE SYSTEM FOR TURBOCHARGERS WITH ROTARY ELECTRIC MACHINES

[75] Inventor: Hideo Kawamura, Samukawa, Japan

[73] Assignee: Isuzu Ceramics Research Institute Co., Ltd., Kanagawa, Japan

[21] Appl. No.: 380,316

[22] Filed: Jul. 17, 1989

[30] Foreign Application Priority Data

Jul. 18, 1988 [JP] Japan ............................... 63-178722

[51] Int. Cl.$^5$ ............................................. F02B 37/04
[52] U.S. Cl. ......................................... 60/608; 60/612
[58] Field of Search ......................... 60/607, 608, 612; 123/193 C

[56] References Cited

U.S. PATENT DOCUMENTS

- 4,680,933  7/1987  Bozung et al. ........................ 60/608
  4,798,257  1/1989  Kawamura et al. ................... 60/608

Primary Examiner—Michael Koczo
Attorney, Agent, or Firm—Staas & Halsey

[57] ABSTRACT

A turbocharger drive system associated with an internal combustion engine includes a plurality of turbochargers drivable by exhaust gases from the engine, a plurality of rotary electric machines mounted on the rotatable shafts, respectively, of the turbochargers and operable as electric motors or generators, and a single rotary electric machine coupled to the rotatable shaft of the engine. When the engine rotates at a low speed and under a high load, the rotary electric machine coupled to the engine shaft operates as an electric generator to generate electric power to drive the rotary electric machines mounted on the turbocharger shafts as electric motors, so that the boost pressure is increased to increase the output power of the engine. Since the multistage turbochargers are power-assisted by the respective rotary electric machines, the boost pressure builds up sharply. When the engine rotates at a high speed, the rotary electric machines combined with the turbochargers generate electric power to drive the rotary electric machine coupled to the engine shaft as an electric motor, thus feeding exhaust energy back to the engine output power.

6 Claims, 4 Drawing Sheets

DRIVE SYSTEM FOR TURBOCHARGERS WITH ROTARY ELECTRIC MACHINES

BACKGROUND OF THE INVENTION

1. Field of the Invention:

The present invention relates to a drive system for turbochargers with motor-generators mounted on their rotatable shafts, and more particularly to a drive system for a multistage turbocharger assembly with series-connected turbines and compressors.

2. Description of Prior Art:

There are known turbine-driven turbochargers in which exhaust gases emitted from an engine are led to an exhaust turbine to rotate the turbine and a compressor coupled thereto at a high speed for supercharging the engine. Japanese Laid-Open Patent Publication No. 60-43152 discloses a system for recovering and feeding any remaining exhaust energy back to the shaft of the engine after the exhaust energy from the engine has been recovered by the exhaust turbine to drive the compressor. The disclosed system has a rotary electric machine and an intake air compressor which are mounted on the rotatable shaft of the exhaust turbine. The exhaust energy which is recovered as rotational energy by the exhaust turbine is used to rotate the compressor for supercharging the engine. At the same time, the rotary electric machine operates as an electric generator to generate electric energy which is supplied to an electric motor coupled to the shaft of the engine. The motor coupled to the engine shaft is rotated to assist in rotating the ending shaft, thereby feeding the exhaust energy recovered by the exhaust turbine back to the engine shaft.

When the engine rotates at a low speed and hence the exhaust energy is small, however, the above system can neither generate electric energy nor supercharge the engine. To avoid this shortcoming, it has been proposed a system in which when the engine rotates at a low speed, the rotary electric machine mounted on the rotatable shaft of the exhaust turbine is operated as a motor to rotate the compressor through the rotatable shaft for supercharging the engine (see Japanese Laid-Open Patent Publication No. 60-195329).

The system disclosed in the latter publication however requires large electric power to drive the rotary electric machine. Since such large electric power is supplied from a battery, the battery tends to run out of the stored electric energy quickly, and various other electric devices connected to the battery may not be supplied with a desired amount of electric energy. The battery is also apt to be of a short service life. Since only one turbocharger is mounted on the engine, the inertial mass of the rotating parts of the turbocharger is large, making the turbocharger less responsive to the operation of an accelerator pedal.

SUMMARY OF THE INVENTION

It is an object of the present invention to provide a turbocharger drive system which includes a plurality of series-connected turbochargers coupled to an engine exhaust system and having respective rotatable shafts with motor-generators mounted thereon, and which does not depend on any battery for electric power that is required to drive the motor-generators as motors for assisting in rotating the turbochargers.

Another object of the present invention is to provide a turbocharger drive system which includes a motor-generator coupled to the output shaft of an engine and a turbocharger having a rotatable shaft with a motor-generator mounted thereon, and which employs electric power generated by the motor-generator mounted on the shaft of the turbocharger and operating as a generator, for driving the motor-generator coupled to the engine shaft as a motor to assist in rotating the engine.

According to the present invention, there is provided a turbocharger drive system combined with an internal combustion engine, comprising means for detecting a load on the internal combustion engine, means for detecting a rotational speed of the internal combustion engine, means for detecting a boost pressure of the internal combustion engine, means for storing a boost pressure corresponding to a detected load on the internal combustion engine, a plurality of turbochargers having series-connected exhaust turbines, respectively, and series-connected compressors, respectively, a plurality of rotary electric machines mounted respectively on rotatable shafts of the turbochargers, a single rotary electric machine drivable by an output shaft of the internal combustion engine, means for driving the single rotary electric machine as an electric generator, means for calculating the difference between the boost pressure corresponding to the detected load and the detected boost pressure, means for driving the plurality of rotary electric machines as electric motors successively from the rotary electric machine combined with the turbocharger closest to the internal combustion engine as the difference increases when the detected boost pressure is lower than the boost pressure corresponding to the detected load, and means for supplying electric power from the electric generator to the motors.

According to the present invention, there is also provided a turbocharger drive system combined with an internal combustion engine, comprising means for detecting a load on the internal combustion engine, means for detecting a rotational speed of the internal combustion engine, a turbocharger assembly having a rotatable shaft, a first rotary electric machine drivable by the rotatable shaft of the turbocharger assembly, a second rotary electric machine operatively coupled to an output shaft of the internal combustion engine, means for driving the first rotary electric machine as an electric generator, means for driving the second rotary electric machine as an electric motor, and means for supplying electric power from the electric generator to the motor.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
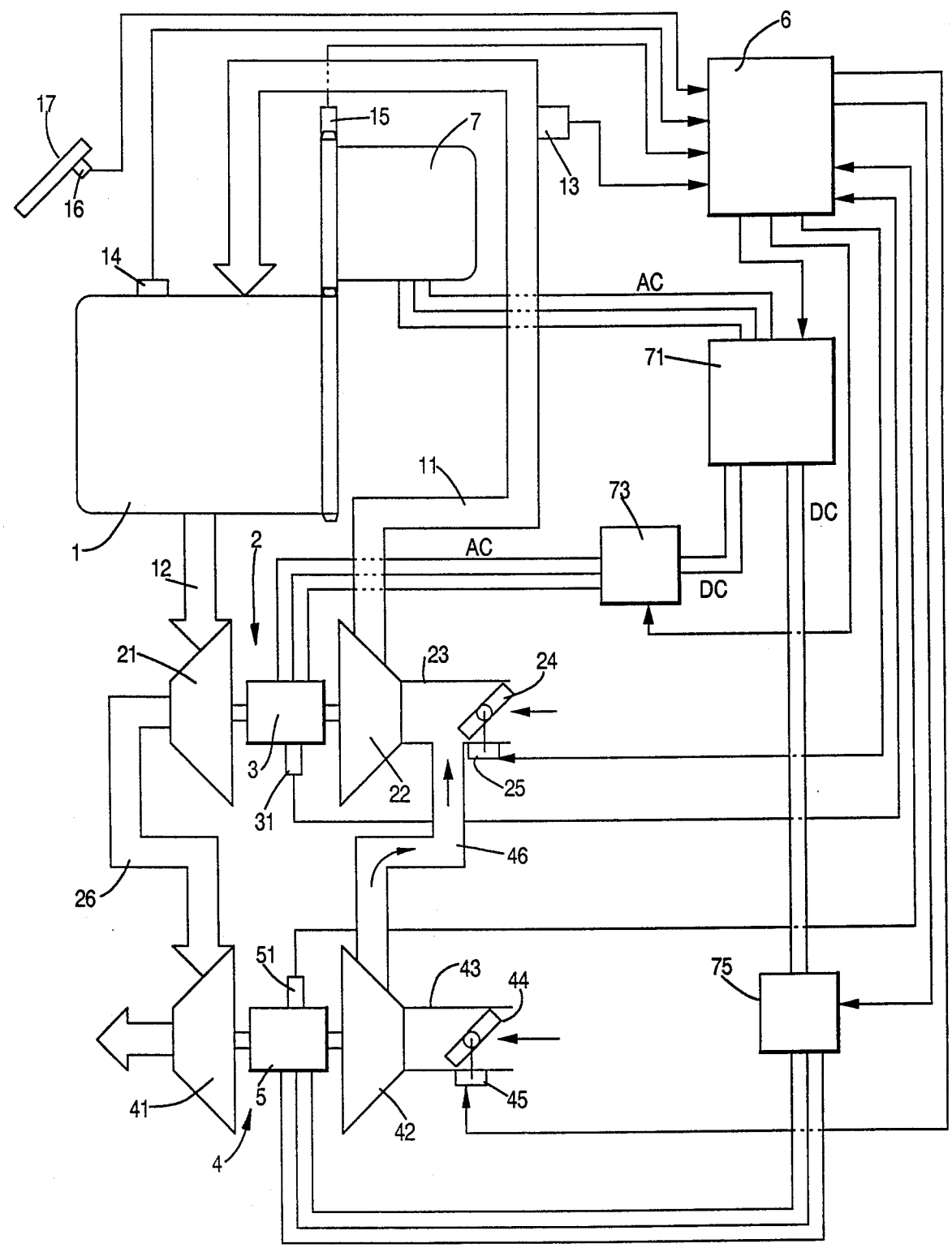
FIG. 1 is a block diagram of a drive system for turbochargers with rotary electric machines according to the present invention.

FIG. 1 shows in block form of a turbocharger drive system according to the present invention.

An engine 1 mounted on a motor vehicle (not shown) is a thermally insulated internal combustion engine having at least inner walls of cylinders and a cylinder head, piston rings, piston head surfaces, an inner wall of an exhaust passage, and intake and exhaust valves, all made of thermally insulated fine ceramic. Air supplied from an air intake passage 11 and fuel injected into the cylinders are mixed into an air-fuel mixture which is then combusted to produce energy to drive the motor vehicle. Exhaust gases are then discharged from the cylinders through an exhaust passage 12.

A first turbocharger 2 has an exhaust turbine 21 connected to the exhaust passage 12 and a compressor 22 connected to the air intake passage 11. The compressor 22 is directly coupled to the rotatable shaft of the exhaust turbine 21.

When the exhaust turbine 21 is rotated by the exhaust gases discharged by the exhaust passage 12, the compressor 22 is also rotated and compresses intake air which is fed through the air intake passage 11 to supercharge the engine 1. The compressor 22 is coupled to an intake pipe 23 having a valve 24 disposed therein. The intake pipe 23 defines an air passage which is selectively opened and closed by the valve 24 that is controlled by valve actuator 25.

A rotary electric machine 3 is mounted on the rotatable shaft by which the exhaust turbine 21 and the compressor 22 are directly connected to each other. When electric energy is supplied to the rotary electric machine 3, it operates as an electric motor to rotate the compressor 22 for assisting in rotating the compressor 22 to supercharge the engine 1. When the rotary electric machine 3 is rotated by the exhaust turbine 21, it operates as an electric generator to generate electric power. A rotational speed sensor 31 detects the rotational speed of the rotary electric machine 3, i.e., the rotational speed of the first turbocharger 2, and transmits a rotational speed signal to a controller 6 (described later on).

A second turbocharger 4 has an exhaust turbine 41 connected to an exhaust passage 26 of the first turbocharger 2 and a compressor 42 connected to the compressor 22 of the first turbocharger 2 through an air feed pipe 46. The compressor 42 is directly coupled to the rotatable shaft of the exhaust turbine 41.

When the exhaust turbine 41 is rotated by the exhaust gases discharged from the first turbocharger 2 through the exhaust passage 26, the compressor 42 is also rotated and compresses intake air to increase the intake air pressure developed by the compressor 22 through the air feed pipe 46. The compressor 42 is coupled to an intake pipe 43 having a valve 44 disposed therein. The intake pipe 43 defines an air passage which is selectively opened and closed by the valve 44 that is controlled by a valve actuator 45. Control signals are supplied from the controller 6 to the valve actuators 25, 45.

A rotary electric machine 5 is mounted on the rotatable shaft by which the exhaust turbine 41 and the compressor 42 are directly connected to each other. When electric energy is supplied to the rotary electric machine 5, it operates as an electric motor to rotate the compressor 42 for assisting in rotating the compressor 42 to supercharge the engine 1. When the rotary electric machine 5 is rotated by the exhaust turbine 41, it operates as an electric generator to generate electric power. A rotational speed sensor 51 detects the rotational speed of the rotary electric machine 5, i.e., the rotational speed of the second turbocharger 5, and transmits a rotational speed signal to the controller 6. A boost pressure sensor 13 is mounted in the intake passages 11 for detecting the boost pressure of intake air to be supplied to the engine 1. A load sensor 14 is mounted on the engine 1 for detecting the rate of flow of fuel supplied to the engine 1 thereby to detect the load acting on the engine 1. Detected signals from the sensors 13, 14 are also sent to the controller 6.

A rotary electric machine 7 is coupled to the rotatable shaft of the engine 1 through a gear train. When the rotary electric machine 7 is driven by the engine 1, it operates as an electric generator. When electric energy is supplied to the rotary electric machine 7 from a dual electric power converter 71, it operates as an electric motor.

The dual electric power converter device 71 has one three-phase AC terminal and two DC terminals. These two DC terminals are connected parallel to each other in the dual electric power converter device 71, and are coupled to DC terminals of a bidirectional AC/DC converter unit in the dual electric power converter device 71.

The bidirectional AC/DC converter unit comprises an inverter and a converter which are connected parallel to each other. For converting electric energy from DC to AC, the inverter is operated, and for converting electric energy from AC to DC, the converter is operated. The bidirectional AC/DC converter unit will not be described in greater detail as it is a known circuit disclosed in detail in *Thyristor Phase-Controlled Converters*, pages 111 through 144, written by B. R. Pelly and published by WILLY-INTERSCIENCE.

A control signal for switching the operation of the bidirectional AC/DC converter unit is supplied from the controller 6.

Dual converter units 73, 75 each comprise a bidirectional AC/DC converter unit which is identical to the bidirectional AC/DC converter unit as described above. The dual converter unit 73 has a DC terminal connected to one of the DC terminals of the dual electric power converter device 71, and an AC terminal connected to the rotary electric machine 3. The dual converter unit 75 has a DC terminal connected to the other DC terminal of the dual electric power converter device 71, and a AC terminal connected to the rotary electric machine 5.

The rotational speed of the engine 1 is detected by an engine rotational speed sensor 15 which applies a detected signal to the controller 6. An accelerator pedal movement sensor 16 detects the amount of depression of an accelerator pedal 17 which controls the output power of the engine 1. A detected signal from the accelerator pedal movement sensor 16 is sent to the controller 6.

The controller 6 comprises a microcomputer and has a central processing unit for effecting various arithmetic operations, memories for storing a processing or control sequence, and input/output ports. When signals from the various sensors are applied to the controller 6, the controller 6 carries out predetermined arithmetic operations and deliver control signals to the valve actuators 25, 45, the dual electric power converter device 71, and the dual converter units 73, 75 according to the stored control sequence.

Operation of the turbocharger drive system thus constructed will be described below.

When the rotational speed of the engine 1 is high and a large amount of exhaust gases is discharged from the exhaust passage 12, the first and second turbochargers 2, 4 are operated by the energy of the exhaust gases. The valve 24 associated with the first turbocharger 2 is opened, and the valve 44 associated with the second turbocharger 4 is closed. The engine 1 is supercharged by the compressor 22 of the first turbocharger 2. The rotary electric machine 3 is operated as a generator, and electric power generated by the rotary electric machine 3 is supplied through the dual converter unit 73 and the dual electric power converter device 71 to the rotary electric machine 7 to rotate the latter for assisting in rotating the rotatable shaft of the engine 1, so that the exhaust gas energy is fed back to the engine 1.

During this time, the controller 6 calculates a power supply frequency for rotating the rotary electric machine 7 at a speed higher than the engine 1, based on the output signal from the engine rotational speed sensor 15. The controller 6 then controls the output frequency of the inverter of the dual electric power converter 71 based on the calculated power supply frequency, while operating the rotary electric machine 7 as a motor.

The rotary electric machine 5 combined with the second turbocharger 4 is also operated as a generator, and electric power generated by the rotary electric machine 5 is supplied through the dual converter unit 75 and the dual electric power converter device 71 to the rotary electric machine 7. The rotary electric machine 7 is therefore driven to assist in rotating the rotatable shaft of the engine 1, so that the exhaust gas energy is fed back to the engine 1.

At this time, the controller 6 controls the output voltage of the converter of the dual converter unit 75 to equalize the DC output voltage of the dual converter unit 75 with the output voltage of the dual converter unit 73. The controller 6 also measures the direct currents of the dual converter units 73, 75 with sensors (not shown), and controls the proportion of loads borne by the dual converter units 73, 75.

If the engine 1 undergoes a high load and the rotational speed of the engine 1 does not increase even by depressing the accelerator pedal 17, then the valve 24 is closed and the valve 44 is opened. The rotary electric machines 3, 5 combined with the first and second turbochargers 2, 4 are operated as motors to assist in rotating the compressors 22, 42 for supercharging the engine 1, thereby increasing the torque produced by the engine 1.

The electric power which drives the rotary electric machines 3, 5 at this time is generated by the rotary electric machine 7.

The electric power generated by the rotary electric machine 7 is converted by the dual electric power converter 71 to DC electric power that is supplied to the dual converter units 73, 75. The controller 6 calculates power supply frequencies at which the rotary electric machines 3, 5 can be operated as motors, based on the output signals from the rotational speed sensors 31, 51. The controller 6 then controls the output frequencies of the inverters of the dual converter units 73, 75 based on the calculated power supply frequencies.

The DC electric power supplied to the dual converter units 73, 75 is then converted to three-phase AC electric power having the above output frequencies.

The three-phase AC electric power is then supplied to the rotary electric machines 3, 5 to operate them as motors.

Figure 2A:
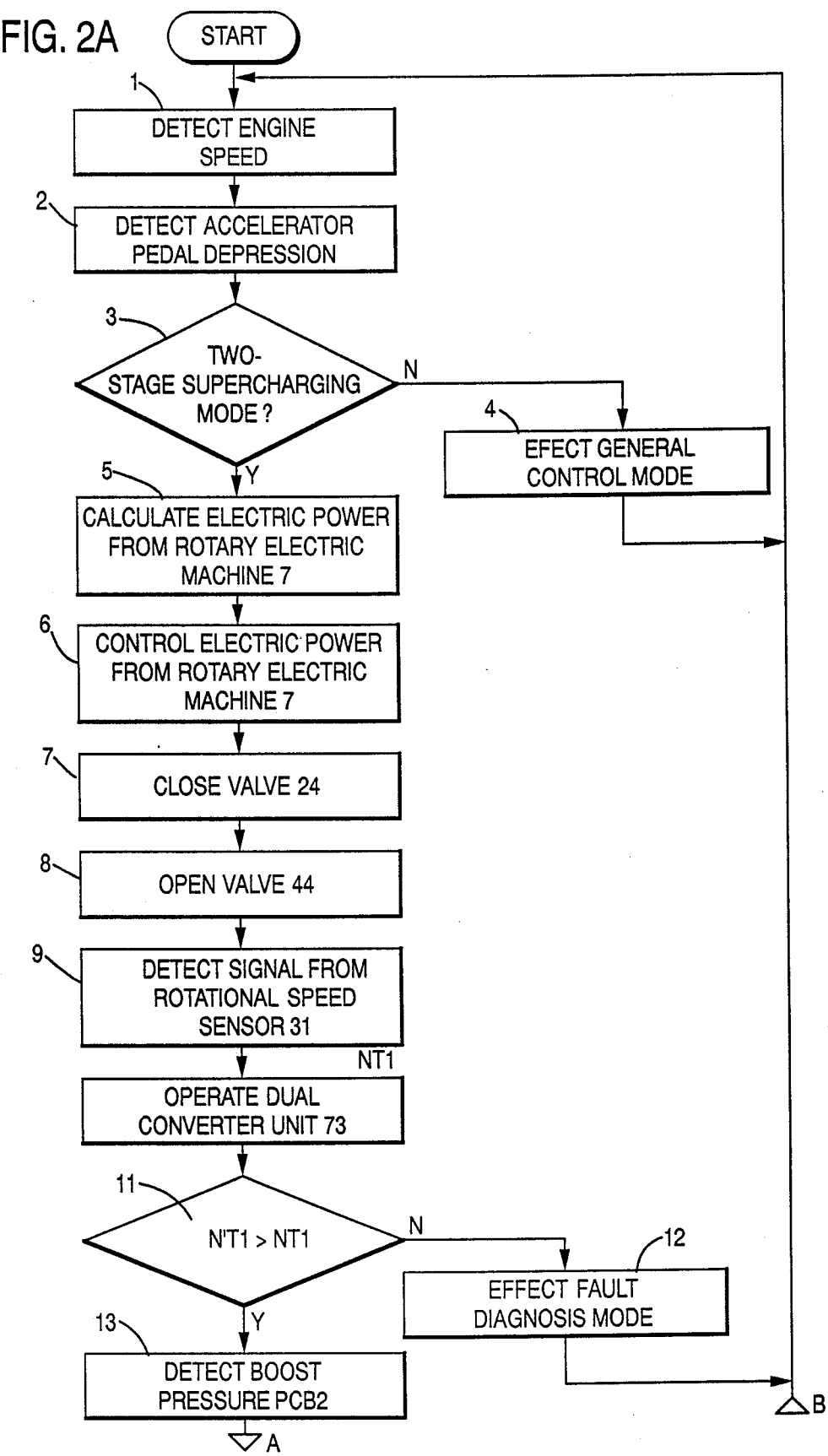
FIGS. 2A and 2B are a flowchart of an operation sequence of the drive system shown in FIG. 1.
Figure 2B:
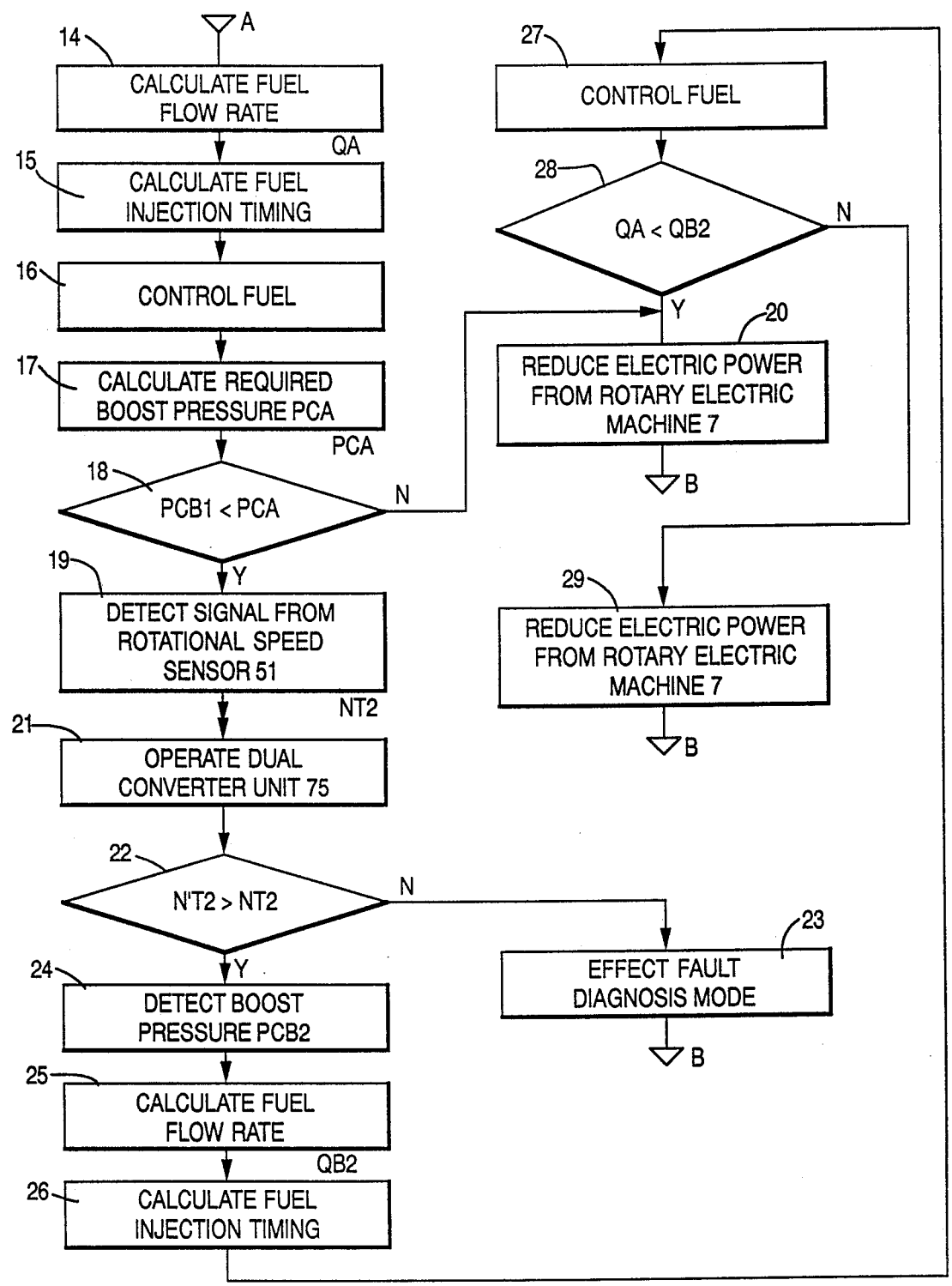

FIGS. 2A and 2B are a flowchart showing an operation sequence to be executed by the controller 6.

The rotational speed signal from the engine rotational speed sensor 15 is read in a step 1.

The accelerator pedal depression signal from the accelerator pedal movement sensor 16 is read in a step 2.

In a step 3, the controller 6 then determines, based on the detected signals read in the steps 1, 2, whether the engine 1 rotates at low speed and undergoes a high load and the drive system is to be controlled in a two-stage supercharging mode to increase the pressure of intake air, or not. If the intake air pressure is to be increased, control proceeds to a step 5, and if not, control goes to a step 4.

In the step 4, the drive system is controlled in a general mode in which the rotary electric machines 3, 5 are not operated as motors.

In the step 5, the controller 6 calculates the amounts of electric power to be supplied from the rotary electric machine 7 operating as a generator to the rotary electric machines 3, 5.

Then, the controller 6 applies a signal to the dual electric power converter device 71 to control the output electric power from the dual electric power converter device 71 based on the calculated amounts of electric power in a step 6.

In a step 7, the controller 6 applies a signal to the valve actuator 25 to close the valve 24 disposed in the intake pipe 23 of the first turbocharger 2.

In a step 8, the controller 6 applies a signal to the valve actuator 45 to open the valve 44 disposed in the intake pipe 43 of the second turbocharger 4.

The rotational speed N'T1 of the first turbocharger 2 is detected by the rotational speed sensor 31 and sent to the controller 6 in a step 9.

In a step 10, the controller 6 applies a signal to the dual converter unit 73 to convert the output electric power from the dual electric power converter device 71 to three-phase electric power having such a frequency as to rotate the rotary electric machine 3 at a speed higher than the rotational speed NT1 detected in the step 9. The converted electric power is supplied from the dual converter unit 73 to the rotary electric machine 3 to drive the latter as a motor.

The rotational speed N'T1 of the first turbocharger 2 is detected again by the rotational speed sensor 31, and is compared with the rotational speed NT1 to determine whether the rotational speed of the first turbocharger 2 has increased or not in a step 11. If not increased, control goes to a step 12, and if increased, control proceeds to a step 13.

In the step 12, the controller 6 diagnoses the drive system for a fault in a predetermined fault diagnosis mode.

In the step 13, the controller 6 reads the detected signal PCB1 from the boost pressure sensor 13.

Then, the controller 6 calculates in a step 14 a fuel flow rate QA corresponding to the detected signal PCB1 read in the step 13.

In a next step 15, the controller 6 calculates a fuel injection timing based on the rotational speed signal and the accelerator pedal depression signal read in the steps 1, 2, respectively.

In a step 16, the controller 6 supplies fuel at the calculated fuel flow rate QA to the engine 1 at the timing calculated in the step 15.

In a step 17, the controller 6 calculates a required boost pressure PCA corresponding to the detected signal read in the step 2.

The controller 6 then compares in a step 18 the detected signal PCB1 read in the step 13 and the required boost pressure PCA calculated in the step 17. If PCA is smaller than PCB1, then control goes to a step 20, and if PCA is larger than PcB1, then control proceeds to a step 19.

In the step 19, the controller 6 reads the rotational speed NT2 of the second turbocharger 4 from the rotational speed sensor 51.

In the step 20, the controller 6 applies a signal to the dual electric power converter device 71 to lower the output electric power from the dual electric power converter device 71.

In a next step 21, the controller 6 applies a signal to the dual converter unit 75 to convert the output electric power from the dual electric power converter device 71 to three-phase electric power having such a frequency as to rotate the rotary electric machine 5 at a speed higher than the rotational speed NT2 detected in the step 19. The converted electric power is supplied from the dual converter unit 75 to the rotary electric machine 5 to drive the latter as a motor.

The rotational speed N'T2 of the rotary electric machine 5 is detected again, and compared with the rotational speed NT2 to determine whether the rotational speed of the second turbocharger 4 has increased or not in a step 22. If not increased, control goes to a step 23, and if increased, control proceeds to a step 24.

In the step 23, the controller diagnoses the drive system for a fault in a predetermined fault diagnosis mode.

In the step 24, the controller 6 reads again the detected signal PCB2 from the boost pressure sensor 13.

Then, the controller 6 calculates in a step 25 a fuel flow rate QB2 corresponding to the detected signal PCB2 read in the step 24.

In a next step 26, the controller 6 calculates again a fuel injection timing based on the rotational speed signal and the accelerator pedal depression signal read in the steps 1, 2, respectively.

In a step 27, the controller 6 supplies fuel at the calculated fuel flow rate QB2 to the engine 1 at the timing calculated in the step 26.

A step 28 then compares the fuel flow rate QA calculated in the step 14 and the fuel flow rate QB2 calculated in the step 25. If the fuel flow rate QB2 is greater than the fuel flow rate QA, then control goes to the step 20, and if the fuel flow rate QA is greater than the fuel flow rate QB2, then control goes to a step 29.

In the step 29, the controller 6 applies a signal to the dual electric power converter device 71 to increase the output electric power therefrom.

According to the present invention, the turbochargers 2, 4 are in a two-stage configuration to reduce their respective moments of inertia for thereby improving their response to the supply of electric power from the dual converter units 73, 75. When the turbochargers 2, 4 are started, they can be supplied with large instantaneous electric power so that their initial rotational speeds can be increased rapidly.

Figure 3:
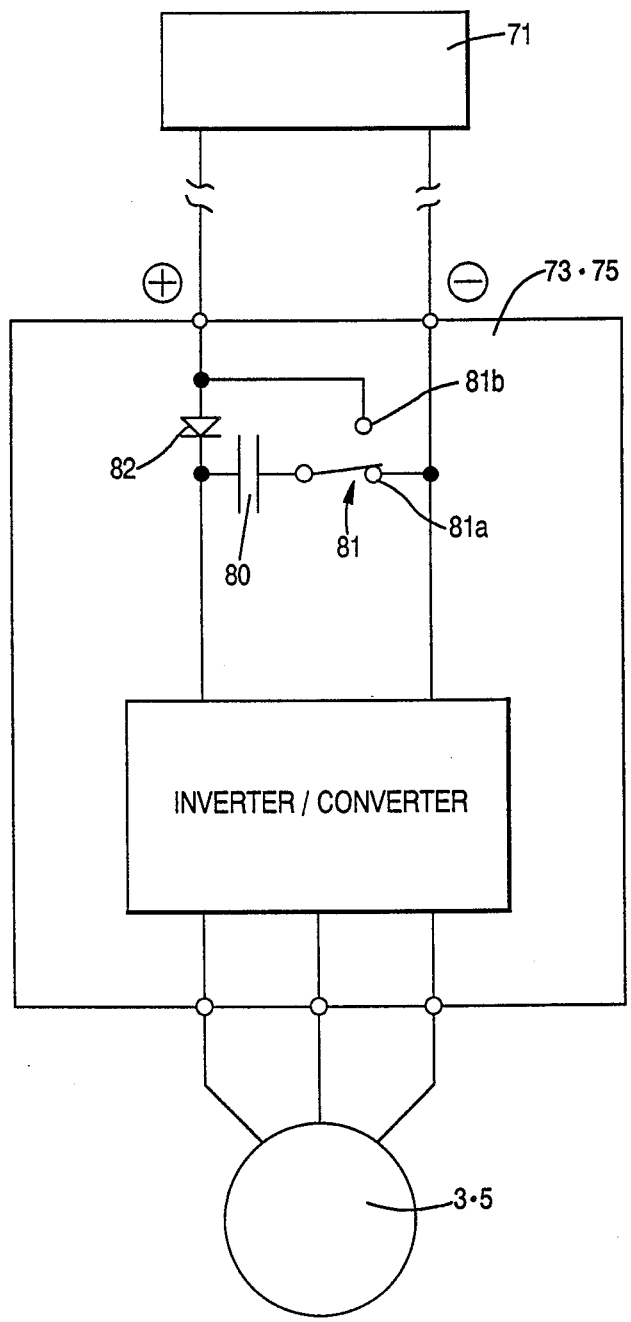
FIG. 3 is a block diagram of a high-electric-power generator circuit in each of dual converter units in the drive system.

FIG. 3 shows a high-electric-power generator circuit in each of the dual converter units 73, 75. The high-electric-power generator circuit includes a capacitor 80 connected through a two-contact switch 81 between DC terminals. The two-contact switch 81 has a terminal 81a connected to the negative DC terminal and a terminal 81b connected to the positive DC terminal. One terminal of the capacitor 80 is selectively connected to one of the terminals 81a, 81b. A diode 82 is coupled between the other terminal of the capacitor 80 and the terminal 81b.

Normally, the two-contact switch 81 is shifted to the terminal 81a and the capacitor 80 is charged. When a control signal for starting the rotary electric machine 73 or 75 is applied from the controller 6, the two-contact switch 81 is shifted to the terminal 81b. The voltage between the DC terminals is increased by the voltage across the capacitor 80. Thus, a voltage which is about twice the normal voltage is instantaneously applied to the inverter to increase the output from the inverter. Therefore, the rotational speed of the rotary electric machine 3 or 5 connected to the inverter is rapidly increased. Where the internal resistance of the dual electric power converter device 71 which supplies electric power is large, the internal resistance at the time of starting the rotary electric machine can be reduced by adding a capacitor between the output terminals of the dual electric power converter device 71.

With the present invention, when the two turbochargers with motor-generators mounted respectively on the rotatable shafts of their exhaust turbines connected in series with the exhaust passage from the engine are controlled, the rotary electric machine coupled to the engine is operated as a generator to supply electric power to the motor-generators which are operated as motors when the engine rotates at a low speed and undergoes a high load. Since no electric power is supplied from a battery, the electric power supplied to the motor-generators can be supplied stably over a long period of time. The engine combined with the turbocharger drive system of the invention can produce an increased torque due to the two-stage turbochargers driven by the motor-generators while the engine is rotating at a low speed. Consequently, the number of gear positions provided by a transmission can be reduced, a condition which has not been possible with a conventional single-stage turbocharger which is driven by only an exhaust turbine, so that the weight and cost of the motor vehicle can be lowered.

Although a certain preferred embodiment has been shown and described, it should be understood that many changes and modifications may be made therein without departing from the scope of the appended claims.

What is claimed is:

1. A turbocharger drive system combined with an internal combustion engine, comprising:
   means for detecting the load on the internal combustion engine;
   means for detecting the rotational speed of the internal combustion engine;
   means for detecting the boost pressure of the internal combustion engine;
   means for storing the boost pressure corresponding to the detected load on the internal combustion engine;
   a plurality of turbochargers having series-connected exhaust turbines, respectively, and series-connected compressors, respectively;

a plurality of rotary electric machines mounted respectively on rotatable shafts of said turbochargers;
a single rotary electric machine drivable by an output shaft of the internal combustion engine;
means for driving said single rotary electric machine as an electric generator;
means for calculating the difference between the boost pressure corresponding to the detected load and the detected boost pressure;
means for driving said plurality of rotary electric machines as electric motors successively from the rotary electric machine combined with the turbocharger closest to the internal combustion engine as said difference increases when said detected boost pressure is lower than said boost pressure corresponding to said detected load; and
means for supplying electric power from said electric generator to said motors.

2. A turbocharger drive system according to claim 1, wherein said electric generator comprises an AC electric generator, said means for supplying electric power comprises a converter for rectifying AC electric power generated by said AC electric generator into DC electric power, and an inverter for converting the DC electric power to AC electric power having a predetermined frequency and supplying the AC electric power to said motors.

3. A turbocharger drive system according to claim 2, wherein said means for driving said plurality of rotary electric machines has means for increasing electric power supplied to the plurality of rotary electric machines when the latter start to be driven.

4. A turbocharger drive system according to claim 1, further including air intake passages coupled respectively to the compressors of said plurality of turbochargers, and means for successively opening said air intake passages.

5. A turbocharger drive system according to claim 1 wherein said internal combustion engine comprises a thermally insulated engine having at least inner walls of combustion chambers made of thermally insulating ceramic.

6. A turbocharger drive system according to claim 2, wherein said internal combustion engine comprises a thermally insulated engine having at least inner walls of combustion chambers made of thermally insulating ceramic.

* * * * *

UNITED STATES PATENT AND TRADEMARK OFFICE
CERTIFICATE OF CORRECTION

PATENT NO. : 4,958,497
DATED : September 25, 1990
INVENTOR(S) : Hideo Kawamura

It is certified that error appears in the above-identified patent and that said Letters Patent is hereby corrected as shown below:

TITLE PAGE [75] Inventor:, "Samukawa" should be --Kanagawa--.

Col. 7, line 35, after "controller" insert --6--.

Signed and Sealed this

Seventh Day of April, 1992

Attest:

HARRY F. MANBECK, JR.

*Attesting Officer*     *Commissioner of Patents and Trademarks*